(12) United States Patent
Choi et al.

(10) Patent No.: US 11,602,975 B2
(45) Date of Patent: Mar. 14, 2023

(54) VEHICLE BATTERY MANAGEMENT APPARATUS AND METHOD THEREOF

(71) Applicants: HYUNDAI MOTOR COMPANY, Seoul (KR); KIA MOTORS CORPORATION, Seoul (KR)

(72) Inventors: Kwon Hyoung Choi, Suwon-si (KR); Jin Hyung Lee, Seoul (KR); Dea Ki Cheong, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 238 days.

(21) Appl. No.: 17/076,543

(22) Filed: Oct. 21, 2020

(65) Prior Publication Data

US 2021/0402849 A1    Dec. 30, 2021

(30) Foreign Application Priority Data

Jun. 30, 2020  (KR) .................. 10-2020-0080428

(51) Int. Cl.
| | | |
|---|---|---|
| *B60L 58/00* | (2019.01) | |
| *B60H 1/00* | (2006.01) | |
| *H01M 10/613* | (2014.01) | |
| *H01M 10/625* | (2014.01) | |
| *B60L 58/26* | (2019.01) | |

(52) U.S. Cl.
CPC .......... *B60H 1/00885* (2013.01); *B60L 58/26* (2019.02); *H01M 10/613* (2015.04); *H01M 10/625* (2015.04); *B60H 2001/003* (2013.01); *B60H 2001/00307* (2013.01); *B60L 2240/36* (2013.01); *H01M 2220/20* (2013.01)

(58) Field of Classification Search
CPC ..... B60H 1/00885; B60H 1/322; B60L 58/21; B60L 58/26; H01M 10/613; H01M 10/625; H01M 10/482
See application file for complete search history.

(56) References Cited

U.S. PATENT DOCUMENTS

| | | | |
|---|---|---|---|
| 7,797,958 B2 * | 9/2010 | Alston | B60H 1/00428 62/236 |
| 10,369,898 B2 * | 8/2019 | Newman | B60L 58/26 |
| 2002/0034682 A1 * | 3/2002 | Moores, Jr. | H01M 10/482 429/71 |

(Continued)

FOREIGN PATENT DOCUMENTS

| | | |
|---|---|---|
| CN | 107672465 | 2/2018 |
| KR | 10-0208155 | 7/1999 |

(Continued)

OTHER PUBLICATIONS

European Search Report for European Application No. EP 20 20 3299 dated Mar. 19, 2021 (8 pgs).

*Primary Examiner* — Hau V Phan
(74) *Attorney, Agent, or Firm* — Morgan, Lewis & Bockius LLP (57) ABSTRACT

A vehicle battery management apparatus and a method thereof are provided. The vehicle battery management apparatus includes a battery that supplies power to a vehicle, a cooling device that cools the battery and a controller that monitors a state of the battery during parking and controls the cooling device to cool the battery with a cooling level corresponding to the state of the battery.

18 Claims, 5 Drawing Sheets

(56) References Cited

U.S. PATENT DOCUMENTS

| | | | |
|---|---|---|---|
| 2006/0102333 A1* | 5/2006 | Zeigler | B60H 1/322 165/240 |
| 2007/0298315 A1* | 12/2007 | Yamamoto | B60L 58/21 429/62 |
| 2008/0110189 A1* | 5/2008 | Alston | H01M 50/204 62/236 |
| 2014/0099521 A1* | 4/2014 | Kim | B60L 1/003 429/50 |
| 2019/0190095 A1 | 6/2019 | Park | |

FOREIGN PATENT DOCUMENTS

| | | |
|---|---|---|
| KR | 10-0930701 | 12/2009 |
| KR | 10-2010-0085791 | 7/2010 |

\* cited by examiner

FIG.5

VEHICLE BATTERY MANAGEMENT APPARATUS AND METHOD THEREOF

CROSS-REFERENCE TO RELATED APPLICATION

The present application claims the benefit of priority to Korean Patent Application No. 10-2020-0080428, filed on Jun. 30, 2020, the entire contents of which are incorporated herein by reference.

TECHNICAL FIELD

The present disclosure relates to a technology for promoting safety of not only a vehicle but also an occupant by monitoring a state of a battery provided in the vehicle while parking.

BACKGROUND

Eco-friendly vehicles such as electric vehicles and hybrid vehicles are vehicles that generate power by driving a motor with electric energy stored in a battery (high voltage battery), and the management of the battery that stores energy is very important to ensure the performance and lifetime of the eco-friendly vehicles.

The battery may be overheated due to an internal short circuit or heat occurred in a charging/discharging process, and overheating of the battery may not only degrade the performance of the battery, but also shorten the lifetime of the battery, and may also cause a fire in the vehicle.

Accordingly, a temperature of the battery is properly managed through a water cooling technique or an air cooling technique. As an example, the water-cooling technique is a technique for managing a temperature of a battery using cooling water. When the temperature of the battery is lower than a reference temperature, the cooling water is heated by a temperature raising heater disposed on a cooling water path before circulation, and when the temperature of the battery is higher than the reference temperature, the cooling water is cooled using a radiator or chiller before circulation.

Such a battery temperature management method is a technique that is applied while the vehicle is driving, and has problems in which it is not possible to proactively prevent a fire in the vehicle that may occur when the battery is overheated due to an internal short circuit of the battery or a heat source inside/outside the vehicle during parking (e.g., the ignition of the vehicle is turned off or immediately after charging is completed) and also to provide a warning for evacuation to occupants in advance, thus making it hard to promote the safety of the occupants.

The matters described in this background are prepared to enhance an understanding of the background of the invention, and may include matters other than the prior art already known to those of ordinary skill in the field to which this technology belongs.

SUMMARY

An aspect of the present disclosure provides a vehicle battery management apparatus and a method thereof, which periodically monitor the state of the battery provided in the vehicle while parking, control the cooling device so as to cool the battery with a cooling level corresponding to the state of the battery, and provide a warning for abnormality of the battery to the inside and outside of the vehicle, thus achieving efficient management of the battery and promoting safety of the vehicle and the people located around the vehicle.

The present disclosure is not limited to the above-mentioned advantages, and other advantages of the present disclosure which are not mentioned may be understood by the following description, and will be more clearly understood by embodiments of the present disclosure. It will also be readily apparent that the advantages of the disclosure may be realized by means of the instrumentalities and combinations particularly pointed out in the appended claims.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle battery management apparatus may include a battery that supplies power to a vehicle, a cooling device that cools the battery and a controller that monitors a state of the battery during parking and controls the cooling device so as to cool the battery with a cooling level corresponding to the state of the battery.

According to an embodiment, the controller may control the cooling device so as to cool the battery with a maximum cooling level when the state of the battery satisfies a preset first condition.

According to an embodiment, the cooling device may include an Electric Water Pump (EWP), an air conditioner, a radiator fan, and a 3way valve, and the controller may control the EWP, the air conditioner, and the radiator fan so as to operate at maximum output, and control the 3way valve such that heat exchange is caused between a power electronics (PE) cooling loop and a battery cooling loop.

According to an embodiment, the first condition may include at least one of a state in which an insulation resistance value of the battery is less than a first reference resistance value (L3_IR), a state in which a maximum value of cell temperature values of the battery is greater than a first reference temperature value (L3_T1), and a state in which a preset third condition is not satisfied within a reference time from a time when a preset second condition is satisfied.

According to an embodiment, the vehicle battery management apparatus may further include an outdoor output device configured to output a notification for a temperature abnormality of the battery to outside of the vehicle, and the controller may control the outdoor output device so as to output the notification for the temperature abnormality of the battery when the state of the battery satisfies the first condition.

According to an embodiment, the controller may control the cooling device with a cooling level corresponding to the maximum value of the cell temperature values of the battery when the state of the battery satisfies the second condition.

According to an embodiment, the cooling device may include an Electric Water Pump (EWP), an air conditioner, a radiator fan, and a 3way valve, and the controller may control the EWP, the air conditioner, and the radiator fan so as to start operating, and control the 3way valve such that heat exchange is generated between a power electronics (PE) cooling loop and a battery cooling loop.

According to an embodiment, the second condition may include at least one of a state in which the insulation resistance value of the battery is less than a second reference resistance value (L2_IR) and equal to or greater than the first reference resistance value (L3_IR), a state in which the maximum value of the cell temperature values of the battery is greater than a second reference temperature value (L2_T1) and is less than or equal to the first reference temperature value (L3_T1), a state in which a value obtained by subtracting an average value of the cell temperature values of the battery from the maximum value of the cell temperature values of the battery is greater a first temperature deviation value (T2) and the maximum value of the cell temperature values of the battery is greater than a third reference temperature value (L3_T2), a state in which a value obtained by subtracting an average value of cell voltage values of the battery from a minimum value of the cell voltage values of the battery is greater than a first voltage deviation value (V2), and the maximum value of the cell temperature values of the battery is greater than the third reference temperature value (L3_T2) and a state in which a maximum change rate of the cell temperature values of the battery is greater than a first temperature increase rate (S2) and the maximum value of the cell temperature values of the battery is greater than the third reference temperature value (L3_T2).

According to an embodiment, the vehicle battery management apparatus may further include an indoor output device that outputs a notification for an temperature abnormality of the battery to indoor of the vehicle, and a communication device that communicates with a telematics server, and the controller may control the indoor output device so as to output the notification for the temperature abnormality of the battery and notify the temperature abnormality of the battery to a predetermined terminal through the communication device when the state of the battery satisfies the first condition or the second condition.

According to an embodiment, the controller may continuously monitor the state of the battery when the state of the battery satisfies the first condition, the second condition, or the third condition.

According to an embodiment, the third condition may include at least one of a state in which the insulation resistance value of the battery is less than a third reference resistance value (L1_IR) and equal to or greater than a second reference resistance value (L2_IR), a state in which the maximum value of the cell temperature values of the battery is greater than a fourth reference temperature value (L1_T) and is less than or equal to a second reference temperature value (L2_T1), a state in which a value obtained by subtracting an average value of the cell temperature values of the battery from the maximum value of the cell temperature values of the battery is greater than a second temperature deviation value (T1) and the maximum value of the cell temperature values of the battery is greater than a fifth reference temperature value (L2_T2), a state in which a value obtained by subtracting an average value of cell voltage values of the battery from a minimum value of the cell voltage values of the battery is greater than a second voltage deviation value (V1), and the maximum value of the cell temperature values of the battery is greater than the fifth reference temperature value (L2_T2) and a state in which a maximum change rate of the cell temperature values of the battery is greater than a second temperature increase rate (S1) and the maximum value of the cell temperature values of the battery is greater than the fifth reference temperature value (L2_T2).

According to an aspect of the present disclosure, a vehicle battery management method may include monitoring a state of a battery during parking and controlling a cooling device so as to cool the battery with a cooling level corresponding to the state of the battery.

According to an embodiment, the controlling of the cooling device may include controlling the cooling device so as to cool the battery with a maximum cooling level when the state of the battery satisfies a preset first condition.

According to an embodiment, the controlling of the cooling device may include controlling an outdoor output device so as to output a notification for a temperature abnormality of the battery when the state of the battery satisfies the first condition.

According to an embodiment, the controlling of the cooling device may include controlling the cooling device with a cooling level corresponding to the maximum value of the cell temperature values when the state of the battery satisfies the second condition.

According to an embodiment, the controlling of the cooling device may include controlling an indoor output device so as to output a notification for a temperature abnormality of the battery and notifying the temperature abnormality of the battery to a predetermined terminal through a communication device when the state of the battery satisfies the first condition or the second condition.

According to an embodiment, the controlling of the cooling device may include continuously monitoring the state of the battery when the state of the battery satisfies the first condition, the second condition, or the third condition.

DRAWINGS

In order that the disclosure may be well understood, there will now be described various forms thereof, given by way of example, reference being made to the accompanying drawings, in which.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
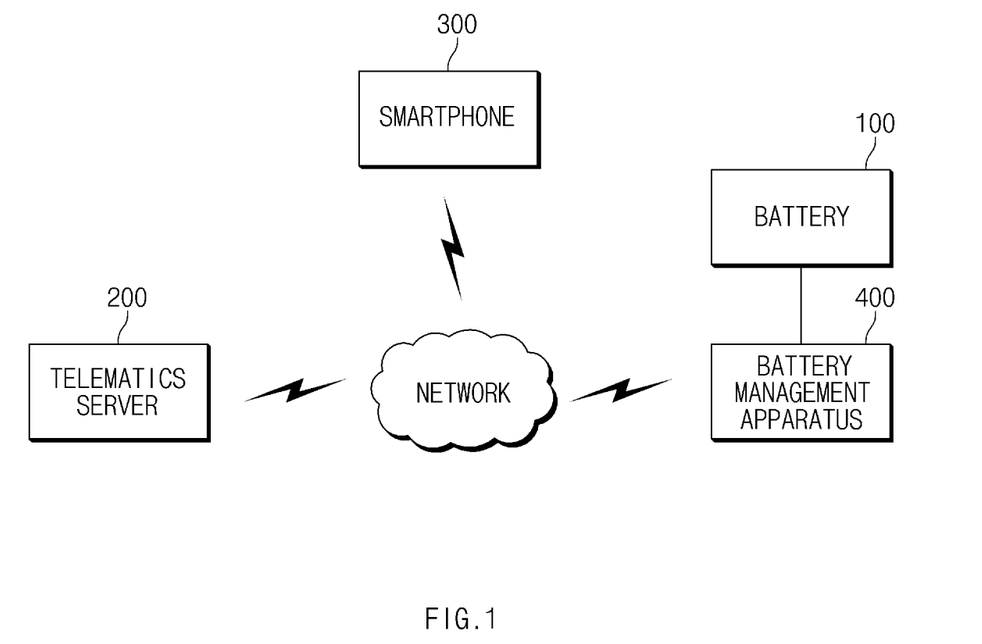
FIG. 1 is a block diagram of a vehicle battery management system in one form of the present disclosure.

FIG. 1 is a block diagram of a vehicle battery management system according to an embodiment of the present disclosure.

As shown in FIG. 1, a vehicle battery management system according to an embodiment of the present disclosure may include a battery 100, a telematics server 200, a smartphone 300, and a battery management apparatus 400.

The battery 100 may be a battery (e.g., a high voltage battery) that provides power to a vehicle (e.g., an electric vehicle), and may be monitored by the battery management apparatus 400 during parking (e.g., when the vehicle is turned off or immediately after charging is completed). In addition, a temperature of the battery 100 may be controlled by the battery management apparatus 400.

The telematics server 200 may be connected to a network and may send a warning text message to a passenger's smartphone 300 at a request for a warning (notification of abnormality in the battery 100) received from the battery management apparatus 400.

The smartphone 300 may notify a vehicle's occupant (e.g., a driver) of risk (abnormality of the battery 100). In addition, according to the present disclosure, it may be possible to notify a driver of risk through various personal wireless communication terminals.

The battery management apparatus 400 may periodically monitor the state of the battery 100 provided in the vehicle while parking, control a cooling device 40 so as to cool the battery 100 with a cooling level corresponding to the state of the battery 100, and provide a warning for abnormality of the battery 100 to the inside and outside of the vehicle, thus achieving efficient management of the battery 100 and promoting safety of the vehicle and the people located around the vehicle.

Hereinafter, a configuration of the battery management apparatus 400 will be described with reference to FIG. 2.

Figure 2:
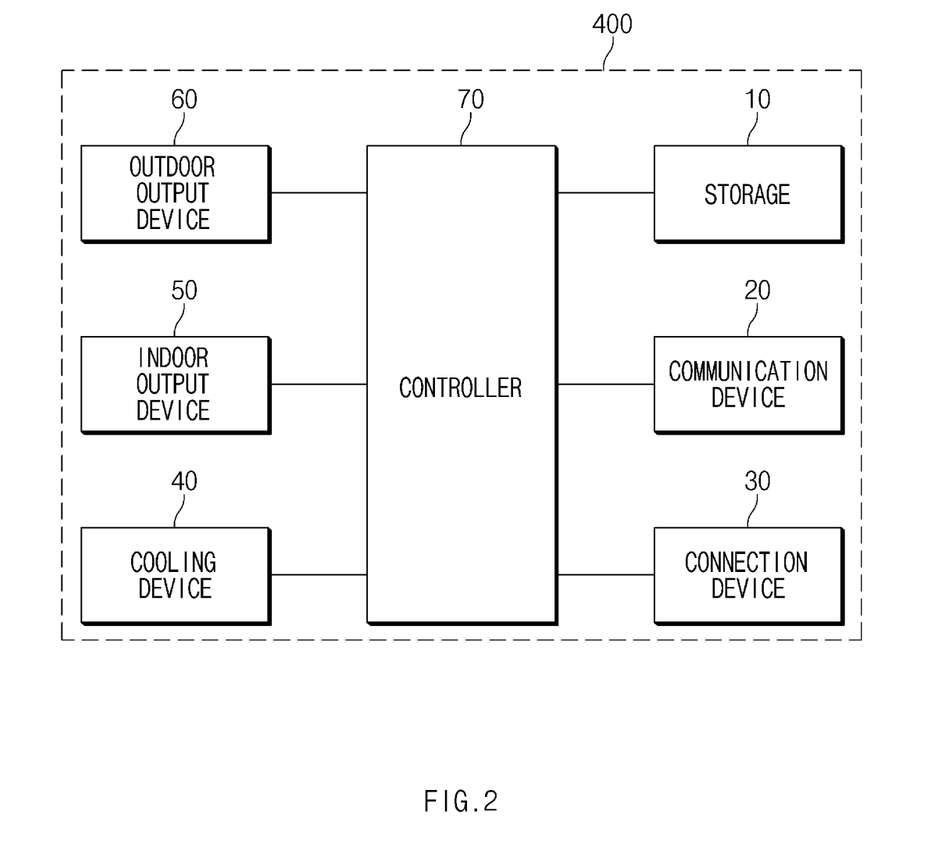
FIG. 2 is a configuration diagram of a vehicle battery management apparatus in one form of the present disclosure.

FIG. 2 is a configuration diagram of a vehicle battery management apparatus according to an embodiment of the present disclosure.

Referring to FIG. 2, the battery management apparatus 400 of a vehicle according to an embodiment of the present disclosure may include storage 10, a communication device 20, a connection device 30, the cooling device 40, an indoor output device 50, an outdoor output device 60, and a controller 70. In this case, according to a method of implementing battery management apparatus 400 for the vehicle according to an embodiment of the present disclosure, the components may be combined with each other as one entity, or some components may be omitted.

The components will be described below. First, the storage 10 may store various logics, algorithms and programs required in the process of periodically monitoring the state of the battery 100 provided in the vehicle while parking, controlling the cooling device 40 so as to cool the battery 100 with a cooling level corresponding to the state of the battery 100, and providing a warning for abnormality of the battery 100 to the inside and outside of the vehicle.

The storage 10 may store a condition for a case in which the state of the battery 100 is normal (hereinafter, referred to as a first level) and a logic used to determine whether the current state of the battery 100 satisfies the condition.

The storage 10 may store a condition for a case in which the state of the battery 100 requires attention (hereinafter, referred to as a second level) and a logic used to determine whether the current state of the battery 100 satisfies the condition.

The storage 10 may store a condition for a case in which the state of the battery 100 requires warning (hereinafter, referred to as a third level) and a logic used to determine whether the current state of the battery 100 satisfies the condition.

The storage 10 may store a condition for a case in which the state of the battery 100 requires evacuation (hereinafter, referred to as a fourth level) and a logic used to determine whether the current state of the battery 100 satisfies the condition.

The storage 10 may store a cooling level corresponding to a state of the battery 100. For example, a first cooling level corresponding to a case in which a state of the battery 100 requires a warning and a second cooling level (maximum cooling level) corresponding to a case in which a state of the battery 100 requires evacuation may be stored.

The storage 10 may include at least one type of storage medium of a flash memory type, a hard disk type, a micro type, and a card type (e.g., an Secure Digital Card (SD card) or an eXtream Digital card (XD card)) of memory, a Random Access Memory (RAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk type of memory.

The communication device 20 may be a module that provides a communication interface with the telematics server 200, and may be connected to the telematics server 200 under the control of the controller 70 to request the telematics server 200 to transmit a warning message (e.g., a notification message for abnormality of the battery 100) to the smartphone 300. Here, the smartphone 300 may include at least one of a driver's smartphone and a passenger's smartphone.

The connection device 30 may be a module that provides a communication interface with a vehicle network, and may collect various types of information and data from the vehicle network. For example, the connection device 30 may collect whether the vehicle is started (ON, OFF), whether charging of the battery 100 is completed, and the like under the control of the controller 70. In this case, an ignition-on state of an electric vehicle may refer to a state in which the vehicle is able to drive after the driver presses an ignition button, and an ignition-off state of the electric vehicle may refer to a state in which the vehicle is unable to drive after the ignition button is pressed by the driver in the ignition-on state. In addition, vehicle networks may include a Controller Area Network (CAN), a Controller Area Network with Flexible Data-rate (CAN FD), a Local Interconnect Network (LIN), FlexRay, Media Oriented Systems Transport (MOST), Ethernet, and the like.

The cooling device 40 may be a device provided in the vehicle to cool various devices (e.g., an engine) including the battery 100, and may include a first cooler 410 and a second cooler 420 according to a cooling method. For reference, the first cooler 410 and the second cooler 420 may be general components provided in a typical vehicle.

Hereinafter, a detailed configuration of the cooling device 40 will be described with reference to FIG. 3.

Figure 3:
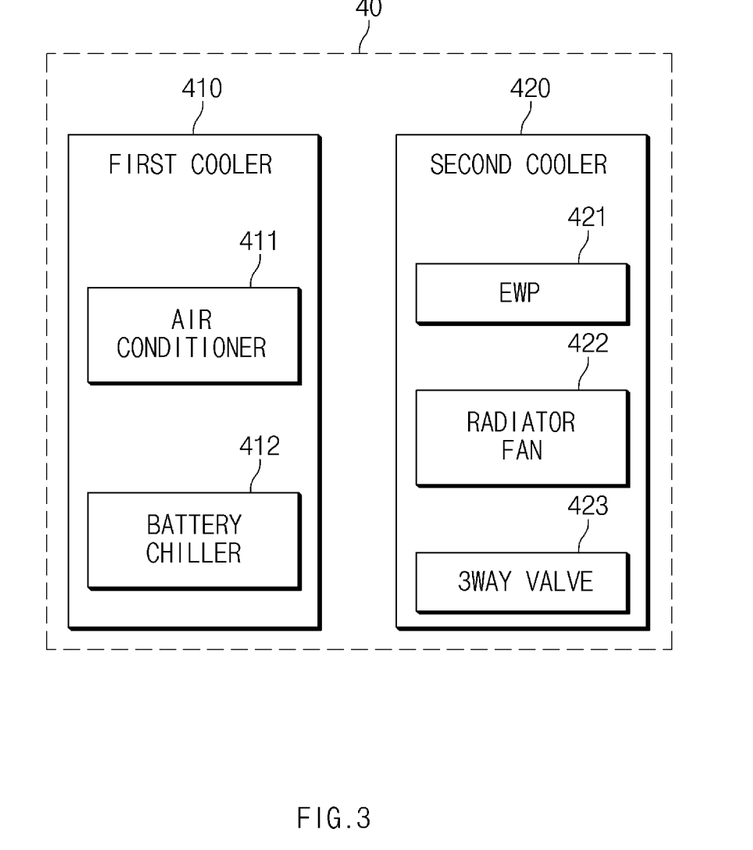
FIG. 3 is a detailed configuration diagram of a cooling device provided in a vehicle battery management apparatus in one form of the present disclosure.

FIG. 3 is a detailed configuration diagram of a cooling device provided in a vehicle battery management apparatus according to an embodiment of the present disclosure.

Referring to FIG. 3, the cooling device 40 provided in a vehicle battery management apparatus according to an embodiment of the present disclosure may include the first cooler 410 and the second cooler 420.

The first cooler 410 may be a kind of actuator that directly cools the battery 100, and may include an air conditioner 411 and a battery chiller 412. The air conditioner 411 and the battery chiller 412 may operate under the control of a Full Automatic Temperature Controller (FATC), which is a well-known technique.

The second cooler 420 may be a kind of actuator that indirectly cools the battery 100 and may include an Electric Water Pump (EWP) 421 that circulates cooling water and a radiator fan 422 that cools the cooling water. In this case, the EWP 421 may include a battery EWP and a power electronics (PE) EWP.

The second cooler 420 may further include a 3way valve 423 connecting a battery cooling loop that is a circulation path of cooling water that cools the battery 100 and a PE cooling loop that is a circulation path of cooling water that cools various electronic devices (e.g., an electric motor, an on-board charger, or an integrated power control device). The 3way valve 423 may cool the battery 100 by directly connecting the battery cooling loop and the PE cooling loop under the control of the controller 70.

The second cooler 420 may further include a heat exchanger (not shown) that indirectly connects the battery cooling loop and the PE cooling loop.

Meanwhile, the indoor output device 50 may be a device that provides a warning for abnormality of the battery 100 to the inside of the vehicle, and may include a cluster, an audio video navigation (AVN) system, a head up display (HUD), and the like. The indoor output device 50 may warn of risk through at least one of a visual warning, an audible warning, and a tactile warning.

The outdoor output device 60 may be a device that warns of abnormality of the battery 100 to the outside of the vehicle, and may include an emergency light, a charging indicator light, a Virtual Engine Sound System (VESS), and the like. The outdoor output device 60 may warn of risk through at least one of a visual warning, an audible warning, and a tactile warning. For reference, the VESS may be a device that generates a virtual exhaust sound through an external speaker when an electric vehicle is driving at a low speed for the safety of pedestrians.

The controller 70 may perform overall control such that each of the components normally performs its function. The controller 70 may be implemented in the form of hardware or software, or may be implemented in a combination of hardware and software. Preferably, the controller 70 may be implemented with a microprocessor, but is not limited thereto In particular, the controller 70 may perform a variety of control in the process of periodically monitoring the state of the battery 100 provided in the vehicle while parking, controlling the cooling device 40 so as to cool the battery 100 with a cooling level corresponding to the state of the battery 100, and providing a warning for abnormality of the battery 100 to the inside and outside of the vehicle.

The controller 70 may identify a parking state of the vehicle based on information obtained from the vehicle network through the connection device 30 (e.g., whether the engine is operating, whether a relay of the battery 100 is turned on, or a vehicle speed).

The controller 70 may periodically monitor an insulation resistance of the battery 100, a cell temperature of the battery 100, and a cell voltage of the battery 100. For example, the controller 70 may monitor the insulation resistance of the battery 100 through an insulation resistance measuring system (not shown), or monitor a temperature of each cell of the battery 100 through a temperature sensor (not shown), or a voltage of each cell of the battery 100 through a voltage sensor (not shown).

The controller 70 may identify a state of the battery 100 based on an insulation resistance value, a cell temperature value, and a cell voltage value of the battery 100 and determine a corresponding risk level.

Hereinafter, a condition under which the controller 70 determines a state of the battery 100 as one of a first level, a second level, a third level, and a fourth level will be described in detail.

[First Level]—Normal

When a state of the battery 100 is normal, the controller 70 may determine the state of the battery 100 as the first level. In this case, when the state of the battery 100 does not belong to any of the second level, the third level, and the fourth level, the controller 70 may determine the state of the battery 100 as the first level.

[Level 2]—Attention (Third Condition)

The controller 70 may determine the state of the battery 100 as the second level when the insulation resistance value of the battery 100 is less than a reference value L1_IR and greater than or equal to a reference value L2_IR. For example, the reference value L1_IR may be 1 kΩ and the reference value L2_IR may be 700Ω.

When the maximum value (hereinafter, the maximum cell temperature value) of cell temperature values of the battery 100 is greater than a reference temperature value L1_T1 and is less than or equal to a reference temperature value L2_T1, the controller 70 may determine the state of the battery 100 as the second level. For example, the reference temperature value L1_T1 may be 70° C. and the reference temperature value L2_T1 may be 80° C.

The controller 70 may determine the state of the battery 100 as the second level when a value obtained by subtracting the average of the cell temperature values of the battery 100 (hereinafter, the average cell temperature value) from the maximum cell temperature value is greater than a temperature deviation value T1, and the maximum cell temperature value is greater than a reference temperature value L2_T2. For example, the temperature deviation value T1 may be 7° C. and the reference temperature value L2_T2 may be 65° C.

The controller 70 may determine the state of the battery 100 as the second level when a value obtained by subtracting the average of cell voltage values of the battery 100 (hereinafter, the average cell voltage value) from the minimum value of the cell voltage values (hereinafter, the minimum cell voltage value) is greater than a voltage deviation value V1, and the maximum cell temperature value is greater than the reference temperature value L2_T2. For example, the voltage deviation value V1 may be 0.5 V.

When the maximum change rate of the cell temperature values of the battery 100 (the maximum change rate of the change rates of the cell temperature values) is greater than a temperature increase rate S1, and the maximum cell temperature value is greater than the temperature reference value L2_T2, the controller may determine the state of the battery 100 as the second level. As an example, the temperature increase rate S1 may be a slope for 1 minute and may be, for example, 3°.

For example, when assuming that the battery 100 includes three cells, the change rate (slope) of the temperature value of a first cell for 1 minute is 3°, and the change rate of the temperature value of a second cell for 1 minute is 1°, the change rate of the temperature value of a third cell for 1 minute is 4°, the maximum change rate of the temperature values of the battery 100 may be 4°.

[Third Level]—Warning (Second Condition)

The controller 70 may determine the state of the battery 100 to the third level when the insulation resistance value of the battery 100 is less than a reference temperature value L2_IR and greater than or equal to a reference temperature value L3_IR. For example, the reference temperature value L3_IR may be 500Ω.

When the maximum value (hereinafter, the maximum cell temperature value) of cell temperature values of the battery 100 is greater than a reference temperature value L2_T1 and is less than or equal to a reference temperature value L3_T1, the controller 70 may determine the state of the battery 100 as the third level. For example, the reference temperature value L3_T1 may be 90° C.

The controller 70 may determine the state of the battery 100 as the third level when a value obtained by subtracting the average of the cell temperature values of the battery 100 (hereinafter, average cell temperature value) from the maximum cell temperature value is greater than a temperature deviation value T2, and the maximum cell temperature value is greater than a reference temperature value L3_T2. For example, the temperature deviation value T2 may be 10° C. and the reference temperature value L3_T2 may be 75° C.

The controller 70 may determine the state of the battery 100 as the third level when a value obtained by subtracting the average of cell voltage values of the battery 100 (hereinafter, the average cell voltage value) from the minimum value of the cell voltage values (hereinafter, the minimum cell voltage value) is greater than a voltage deviation value V2, and the maximum cell temperature value is greater than the reference temperature value L3_T2. For example, the voltage deviation value V2 may be 0.7 V.

The controller 70 may determine the state of the battery 100 as the third level when the maximum change rate of the cell temperature values of the battery 100 is greater than a temperature increase rate S2, and the maximum cell temperature value is greater than the reference temperature value L3_T2. For example, the temperature increase rate S2 may be a slope for 1 minute and may be, for example, 5°.

[Fourth Level]—Evacuation (First Condition)

The controller 70 may determine the state of the battery 100 as the fourth level when the insulation resistance value of the battery 100 is less than the reference temperature value L3_IR.

When the maximum value (hereinafter, the maximum cell temperature value) of cell temperature values of the battery 100 is greater than the reference temperature value L3_T1, the controller 70 may determine the state of the battery 100 as the fourth level.

When the state of the battery 100 does not enter the second level within a reference time (e.g., 10 minutes) after entering the third level, the controller 70 may determine the state of the battery 100 as the fourth level.

Hereinafter, a process of controlling cooling of the battery 100 at each level in the controller 70 will be described in detail.

[First Level]—Normal

The controller 70 may periodically monitor a state of the battery 100 without performing a cooling logic of the battery 100.

[Second Level]—Attention

The controller 70 may turn on a relay of the battery 100 and subsequently monitor the state of the battery 100. That is, the controller 70 may subsequently set the monitoring cycle for monitoring the state of the battery 100.

[Third Level]—Warning

The controller 70 may turn on the relay of the battery 100 and subsequently monitor the state of the battery 100.

The controller 70 may control the cooling device 40 so as to cool the battery 100 with a first cooling level.

The controller 70 may control the EWP 421 so as to output a Revolutions Per Minute (RPM) corresponding to the maximum value of the cell temperature values of the battery 100. In this case, the controller 70 may control a battery EWP and a PE EWP so as to output the RPM corresponding to the maximum value of the cell temperature values of the battery 100.

The controller 70 may control the air conditioner 411 and the battery chiller 412 in a Proportional Integral Derivative (PID) method such that the maximum value of the cell temperature values of the battery 100 is equal to or less than the reference temperature value L3_T2.

The controller 70 may control the radiator fan 422 so as to output an RPM corresponding to the maximum value of the cell temperature values of the battery 100.

The controller 70 may control the 3way valve 423 such that heat exchange is caused between a PE cooling loop and a battery cooling loop.

The controller 70 may warn the vehicle's occupant about abnormality in the temperature of the battery 100 through the indoor output device 50.

The controller 70 may transmit a warning message to a user's smartphone 300 by interworking with the telematics server 200 through the communication device 20.

[Fourth Level]—Evacuation

The controller 70 may turn on the relay of the battery 100 and subsequently monitor the state of the battery 100.

The controller 70 may control the cooling device 40 so as to cool the battery 100 with a second cooling level (maximum cooling level).

The controller 70 may control the EWP 421 so as to operate at maximum output, for example the maximum RPM. In this case, the controller 70 may control the battery EWP and the PE EWP so as to output the maximum RPM.

The controller 70 may control the air conditioner 411 and the battery chiller 412 so as to operate at the maximum output.

The controller 70 may control the radiator fan 422 so as to operate at the maximum output.

The controller 70 may control the 3way valve 423 such that heat exchange is caused between a PE cooling loop and a battery cooling loop.

The controller 70 may warn a vehicle's occupant such that the vehicle's occupant evacuates through the indoor output device 50. That is, the controller 70 may warn the vehicle's occupant about abnormality of the battery 100 through the indoor output device 50.

The controller 70 may warn people around the vehicle such that the people evacuate from the vehicle through the outdoor output device 60. That is, the controller 70 may warn the people around the vehicle of abnormality of the battery 100 through the outdoor output device 60.

The controller 70 may transmit a warning message to a user's smartphone 300 by interworking with the telematics server 200 through the communication device 20.

Figure 4:
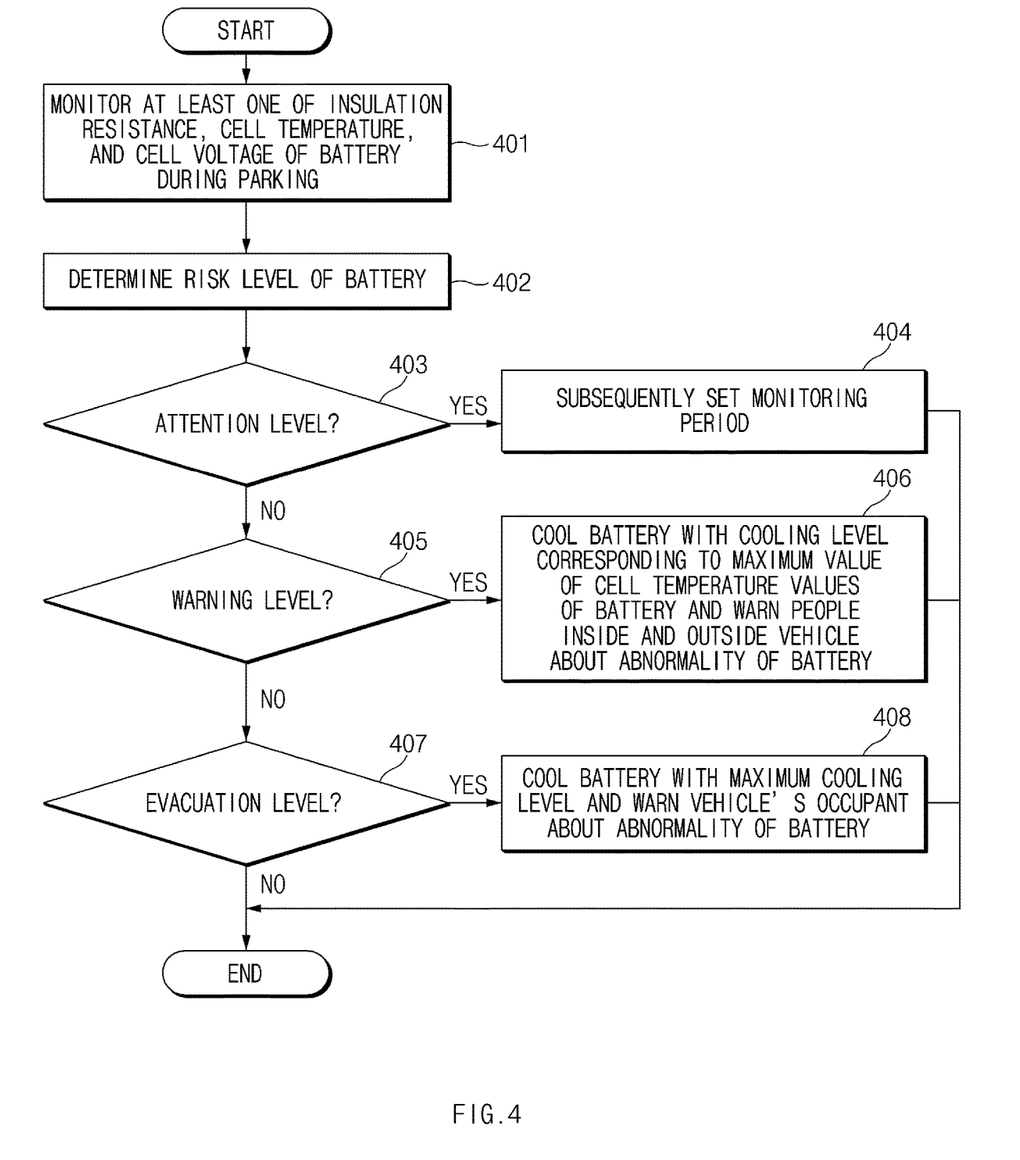
FIG. 4 is a flowchart of a vehicle battery management method in one form of the present disclosure.

FIG. 4 is a flowchart of a vehicle battery management method according to an embodiment of the present disclosure.

First, the controller 70 may periodically monitor at least one of an insulation resistance, a cell temperature, and a cell voltage of the battery 100 during parking (401).

Thereafter, the controller 70 may determine a risk level of the battery 100 as one of a normal level, an attention level, a warning level, and an evacuation level based on at least one of the insulation resistance, the cell temperature, and the cell voltage of the battery 100 (402).

Thereafter, when the determined risk level is the attention level, the controller 70 may subsequently set a monitoring cycle (403, 404).

Thereafter, when the determined risk level is the warning level, the controller 70 may control the cooling of the battery and provide a warning for fire risk to the inside of the vehicle (405, 406).

Thereafter, when the determined risk level is the evacuation level, the controller 70 may control the cooling of the battery and provide a warning for evacuation to the inside and the outside of the vehicle (405, 406).

Figure 5:
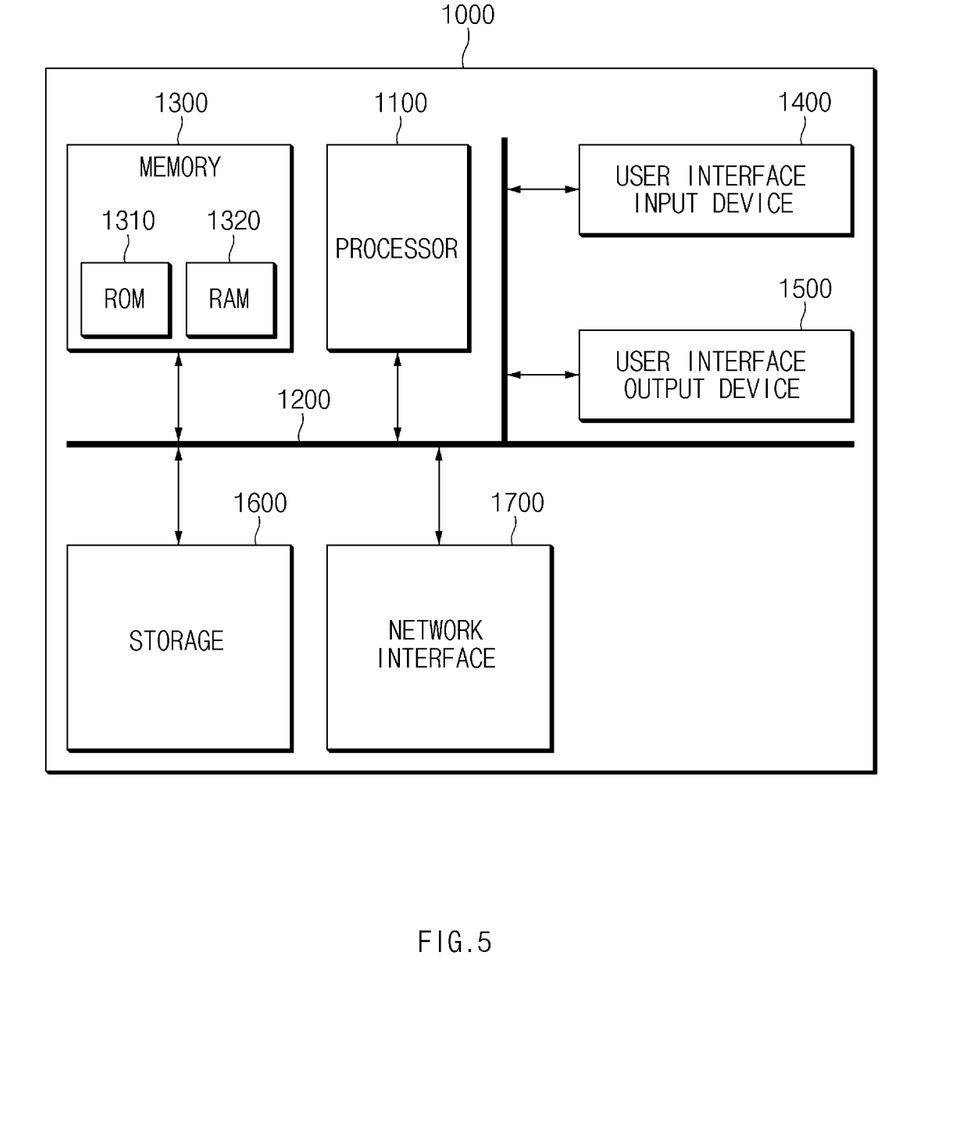
FIG. 5 is a block diagram showing a computing system for executing a vehicle battery management method in one form of the present disclosure.

FIG. 5 is a block diagram showing a computing system for executing a vehicle battery management method according to an embodiment of the present disclosure.

Referring to FIG. 5, the vehicle battery management method according to an embodiment of the present disclosure as described above may be also implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD) a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

The battery management apparatus and method thereof may periodically monitor the state of the battery provided in the vehicle while parking, control the cooling device so as to cool the battery with a cooling level corresponding to the state of the battery, and provide a warning for abnormality of the battery to the inside and outside of the vehicle, thus achieving efficient management of the battery and promoting safety of the vehicle and the people located around the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle battery management apparatus comprising:
a battery configured to supply power to a vehicle;
a cooling device configured to cool the battery; and
a controller configured to:
monitor a state of the battery during parking; and
control the cooling device to cool the battery with a cooling level corresponding to the state of the battery,
wherein the controller is configured to control the cooling device to cool the battery with a maximum cooling level when the state of the battery satisfies a preset first condition, and
wherein the preset first condition is caused by at least one of an insulation resistance of the battery, cell temperature values of the battery, or a reference time for which a preset second condition is maintained.

2. The vehicle battery management apparatus of claim 1, wherein the cooling device includes an Electric, Water Pump (EWP), an air conditioner, a radiator fan, and a three-way valve, and
wherein the controller is configured to:
control the EWP, the air conditioner, and the radiator fan to operate at maximum output; and
control the three-way valve such that heat exchange is generated between a power electronics (PE) cooling loop and a battery cooling loop.

3. The vehicle battery management apparatus of claim 1, wherein the preset first condition includes at least one of:
a state in which the insulation resistance value of the battery is less than a first reference resistance value (L3_IR),
a state in which a maximum value of the cell temperature values of the battery is greater than a first reference temperature value (L3_T1), or
a state in which a preset third condition is not satisfied within the reference time from a time when a preset second condition is satisfied.

4. The vehicle battery management apparatus of claim 3, wherein the controller is configured to:
control the cooling device with a cooling level corresponding to the maximum value of the cell temperature values of the battery when the state of the battery satisfies the preset second condition.

5. The vehicle battery management apparatus of claim 4, wherein the cooling device includes an Electric Water Pump (EWP), an air conditioner, a radiator fan, and three-way valve, and
wherein the controller is configured to:
control the EWP, the air conditioner, and the radiator fan to operate, and control the three-way valve such that heat exchange is generated between a power electronics (PE) cooling loop and a battery cooling loop.

6. The vehicle battery management apparatus of claim 4, wherein the preset second condition includes at least one of:
a state in which the insulation resistance value of the battery is less than a second reference resistance value (L2_IR) and equal to or greater than the first reference resistance value (L3_IR),
a state in which the maximum value of the cell temperature values of the battery is greater than a second reference temperature value (L2_T1) and is less than or equal to the first reference temperature value (L3_T1),
a state in which a value obtained by subtracting an average value of the cell temperature values of the battery from the maximum value of the cell temperature values of the battery is greater than a first temperature deviation value (T2) and the maximum value of the cell temperature values of the battery is greater than a third reference temperature value (L3_T2),
a state in which a value obtained by subtracting an average value of cell voltage values of the battery from a minimum value of the cell voltage values of the battery is greater than a first voltage deviation value (V2), and the maximum value of the cell temperature values of the battery is greater than the third reference temperature value (L3_T2), or
a state in which a maximum Change rate of the cell temperature values of the battery is greater than a first temperature increase rate (S2) and the maximum value of the cell temperature values of the battery is greater than the third reference temperature value (L3_T2).

7. The vehicle battery management apparatus of claim 6, wherein the apparatus further comprises:
an indoor output device configured to output a notification for a temperature abnormality of the battery to indoor of the vehicle; and
a communication device configured to communicate with a telematics server,
wherein the controller is configured to:
control the indoor output device to output the notification for the temperature abnormality of the battery; and
notify the temperature abnormality of the battery to a predetermined terminal through the communication device when the state of the battery satisfies the preset first condition or the preset second condition.

8. The vehicle battery management apparatus of claim 4, wherein the controller is configured to:
continuously monitor the state of the battery when the state of the battery satisfies the preset first condition, the preset second condition, or the preset third condition.

9. The vehicle battery management apparatus of claim 8, wherein the preset third condition includes at least one of:
a state in which the insulation resistance value of the battery is less than a third reference resistance value (L1_IR) and equal to or greater than a second reference resistance value (L2_IR),
a state in which the maximum value of the cell temperature values of the battery is greater than a fourth reference temperature value (L1_T) and is less than or equal to a second reference temperature value (L2_T1),
a state in which a value obtained by subtracting an average value of the cell temperature values of the battery from the maximum value of the cell temperature values of the battery is greater than a second temperature deviation value (T1) and the maximum value of the cell temperature values of the battery is greater than a fifth reference temperature value (L2_T2),
a state in which a value obtained by subtracting an average value of cell voltage values of the battery from a minimum value of the cell voltage values of the battery is greater than a second voltage deviation value (V1), and the maximum value of the cell temperature values of the battery is greater than the fifth reference temperature value (L2_T2), or a state in which a maximum change rate of the cell temperature values of the battery is greater than a second temperature increase rate (S1) and the maximum value of the cell temperature values of the battery is greater than the fifth reference temperature value (L2_T2).

10. The vechicle battery management apparatus of claim 1, wherein the apparatus further comprises:
an outdoor output device configured to output a notification for a temperature abnormality of the battery to outside of the vehicle,
wherein the controller is configured to control the outdoor output device to output the notification for the temperature abnormality of the battery when the state of the battery satisfies the preset first condition.

11. A vehicle battery management method comprising:
monitoring a state of a battery during parking; and
controlling a cooling device to cool the battery with a cooling level corresponding to the state of the battery,
wherein the controlling of the cooling device includes controlling the cooling device to cool the battery with a maximum cooling level when the state of the battery satisfies a preset first condition, and
wherein the preset first condition is caused by at least one of an insulation resistance of the battery, cell temperature values of the battery, or a reference time for which a preset second condition is maintained.

12. The vehicle battery management method of claim 11, wherein the preset first condition includes at least one of:
a state in which the insulation resistance value of the battery is less than a first reference resistance value (L3_IR),
a state in which a maximum value of the cell temperature values of the battery is greater than a first reference temperature value (L3_T1), or
a state in which a preset third condition is not satisfied within the reference time from a time when a preset second condition is satisfied.

13. The vehicle battery management method of claim 12, wherein the controlling of the cooling device includes:
controlling the cooling device with a cooling level corresponding to the maximum value of the cell temperature values when the state of the battery satisfies the preset second condition.

14. The vehicle battery management method of claim 13, wherein the preset second condition includes at least one of:
a state in which the insulation resistance value of the battery is less than a second reference resistance value (L2_IR) and equal to or greater than the first reference resistance value (L3_IR), a state in which the maximum value of the cell temperature values of the battery is greater than a second reference temperature value (L2_T1) and is less than or equal to the first reference temperature value (L3_T1),
a state in which a value obtained by subtracting an average value of the cell temperature values of the battery from the maximum value of the cell temperature values of the battery is greater than a first temperature deviation value (T2) and the maximum value of the cell temperature values of the battery is greater than a third reference temperature value (L3_T2), a state in which a value obtained by subtracting an average value of cell voltage values of the battery from a minimum value of the cell voltage values of the battery is greater than a first voltage deviation value (V2), and the maximum value of the cell temperature values of the battery is greater than the third reference temperature value (L3_T2), or a state in which a maximum change rate of the cell temperature values of the battery is greater than a first temperature increase rate (S2) and the maximum value of the cell temperature values of the battery is greater than the third reference temperature value (L3_T2).

15. The vehicle battery management method of claim 13, wherein the controlling of the cooling device includes:

controlling an indoor output device to output a notification for a temperature abnormality of the battery; and notifying the temperature abnormality of the battery to a predetermined terminal through a communication device when the state of the battery satisfies the preset first condition or the preset second condition.

16. The vehicle battery management method of claim 13, wherein the controlling of the cooling device includes:

continuously monitoring the state of the battery when the state of the battery satisfies the preset first condition, the preset second condition, or the preset third condition.

17. The vehicle battery management method of claim 16, wherein the preset third condition includes at least one of:

a state in which the insulation resistance value of the battery is less than a third reference resistance value (L1_IR) and equal to or greater than a second reference resistance value (L2_IR), a state in which the maximum value of the cell temperature values of the battery is greater than a fourth reference temperature value (L1_T) and is less than or equal to a second reference temperature value (L2_T1), a state in which a value obtained by subtracting an average value of the cell temperature values of the battery from the maximum value of the cell temperature values of the battery is greater than a second temperature deviation value (T1) and the maximum value of the cell temperature values of the battery is greater than a fifth reference temperature value (L2_T2), a state in which a value obtained by subtracting an average value of cell voltage values of the battery from a minimum value of the cell voltage values of the battery is greater than a second voltage deviation value (V1), and the maximum value of the cell temperature values of the battery is greater than the fifth reference temperature value (L2_T2), or a state in which a maximum change rate of the cell temperature values of the battery is greater than a second temperature increase rate (S1) and the maximum value of the cell temperature values of the battery is greater than the fifth reference temperature value (L2_T2).

18. The vehicle battery management method of claim 11, wherein the controlling of the cooling device includes:

controlling an outdoor output device to output a notification for a temperature abnormality of the battery when the state of the battery satisfies the preset first condition.

* * * * *